United States Patent Office

3,655,820
Patented Apr. 11, 1972

3,655,820
PROCESS FOR THE MANUFACTURE OF POLYESTER RESINS
Josef Kaupp, Wiesbaden, Germany, assignor to Farbwerke Hoechst Aktiengesellschaft vormals Meister Lucius & Bruning, Frankfurt am Main, Germany
No Drawing. Continuation-in-part of application Ser. No. 745,121, July 16, 1968. This application Sept. 1, 1970, Ser. No. 68,777
Claims priority, application Germany, Aug. 3, 1967, C 43,029
Int. Cl. C08f *21/00, 21/02*
U.S. Cl. 260—861                                                   9 Claims

ABSTRACT OF THE DISCLOSURE

The invention provides a process for the manufacture of polyester resins having a high flexural strength and impact strength. This is achieved by using high molecular weight polycarboxylic acid esters produced as by-product residues in the oxidation and esterification of p-xylene to give terephthalic acid esters and the recovery of the terephthalic acid esters from the reaction mixture. The high molecular weight polycarboxylic acid esters are distilled from the residues, transesterified with polyhydric alcohols, esterified with maleic acid and cured with olefinically unsaturated compounds such as styrene, acrylic and methacrylic esters and diallylphthalate to produce the polyester resin.

---

This application is a continuation-in-part of pending application Ser. No. 745,121 filed July 16, 1968. The invention relates to a process for the manufacture of polyester resins from high molecular weight aromatic polycarboxylic acid esters contained in the residues obtained when terephthalic acid esters are produced by the oxidation and esterification of p-xylene and recovery of the terephthalic acid ester from the reaction mixture.

It is known to manufacture unsaturated polyester resins by esterification of dibasic or polybasic saturated and unsaturated carboxylic acids with dihydric or polyhydric alcohols, and then optionally to copolymerize unsaturated monomers with these polyesters. The polyesters as a rule show good mechanical and chemical properties but it is at times desirable further to improve various properties.

It has now been found that polyester resins having a surprisingly high flexural strength and impact strength can be achieved if during the process for the manufacture of these polyester resins the polyhydric alcohols are first reacted with those polycarboxylic acid esters that are produced as by-product residues in the oxidation and esterification of p-xylene to give terephthalic acid esters and the subsequent recovery of the terephthalic acid esters from the reaction mixture.

It is known that terephthalic acid dimethyl ester can be effectively prepared by oxidation of p-xylene by the Imhausen process described in Ullmanns' "Encyklopadie der technischen Chemie," vol. 16, pages 752-3 (1965). In accordance with the Imhausen process p-xylene is oxidized to p-toluic acid in the presence of a cobalt catalyst and the acid is esterified with methanol to form the monomethylester. The second methyl group is then oxidized and esterified to form the dimethyl ester. The resulting terephthalic acid dimethyl ester is recovered by distillation to leave a residue that has heretofore been regarded as having little value.

Applicant has found, as pointed out below, that by distilling such residues under reduced pressures a distillate is obtained that is largely composed of a mixture of relatively high molecular weight aromatic polycarboxylic acid esters and that this distillate can be used as a starting material in the preparation of polyester resins having physical properties that are in some respects superior to those prepared from pure aromatic polycarboxylic acids or their anhydrides.

The polycarboxylic acid esters used in the process according to the invention, in general, possess a higher molecular weight than terephthalic acid dimethyl ester. They become enriched in the sump of the column on distillation of terephthalic acid dimethyl ester. These polycarboxylic acids consist, to the extent that their constitution has been established, of dicarboxylic and tricarboxylic acid esters of benzene and of condensed benzene systems, such as diphenyl, diphenylmethane and higher condensates. The dark ester pitch residue can be largely distilled without decomposition in a high vacuum, appropriately in a thin layer evaporator, with light-colored esters being obtained as the distillate. These esters have a saponification number of 430 to 550 depending on the fraction obtained. In order to improve the color, the esters may further be lightly hydrogenated in the presence of nickel catalysts.

The residue distillate is first transesterified with a polyhydric alcohol to form a hydroxyl-terminated polyester which is then further esterified with an unsaturated dicarboxylic acid or its anhydride to form unsaturated polyesters. Thereafter the polyester resin is formed by curing or copolymerizing the unsaturated polyester with an olefinically unsaturated monomer.

Among the polyhydric alcohols that can be used for transesterification of the residue distillate are glycols, for example, polyglycols, diglycols or ethylene glycol, optionally mixed with monohydric or polyhydric alcohols, for example, neopentyl glycol, trimethylolpropane, glycerine, pentaerythritol, hexanediol, pentanediol, hexanetriol, 1,4-dimethylolcyclohexane, oxethylated or oxypropylated bisphenols or the like, as polyhydric alcohols. Herein, polyglycols having 2 primary OH groups offer the advantage that the esterification takes place particularly smoothly. It is also possible to add straight-chain or branched monohydric alcohols, for example, those having 4 to 20 carbon atoms.

It is furthermore possible also to add esters of aromatic and/or aliphatic monocarboxylic and/or dicarboxylic acids, for example, alkyl esters of terephthalic acids, p-toluic acid or fatty acid esters to the high molecular weight polycarboxylic acid esters before the reaction with the polyhydric alcohols.

During the next reaction stage, the unsaturated dicarboxylic acids used may be mixed with other saturated monobasic or polybasic carboxylic acids, for example, with succinic acid, adipic acid, sebacic acid, phthalic acid, isophthalic acid, saturated or unsaturated fatty acids or the like. The use of monocarboxylic acids or their esters is particularly favorable for reducing the viscosity of the unsaturated polyesters.

The weight ratio of the polycarboxylic acid esters serving as the starting material to the additionally used carboxylic acid esters may be varied as desired. The ratio of carboxylic acid esters to the unsaturated dicarboxylic acids may, for example, vary within the range of 10:90 to 90:10 percent by weight.

The unsaturated polyesters obtained according to the invention are light-colored viscous products. They can without difficulty be easily diluted with unsaturated copolymerizable monomers, such as styrene, acrylic or methacrylic acid esters, diallyl phthalate or the like. Their cure, optionally in the form of solutions, also takes place without difficulty after addition of the usual accelerators. Tertiary, especially aromatic, amines, for example, N,N-dimethyl-p-toluidine or N,N-dioxethyl-p-toluidine and/or vanadium salts, for example, vanadyl acetonylacetonates of vanadyl naphthenates have especially proven particularly advantageous as accelerators.

The polyesters manufactured in accordance with the invention can be used for numerous purposes, for example, as a binder for the most diverse fillers for the manufacture of molding and pressing compositions or shaped articles. They are furthermore, optionally after the addition of solvents suitable for impregnation, for example, of fibrous substances such as paper, wood, textiles, mineral fibers such as asbestos or glass fibers which may also be preesnt as a fleece or woven fabric, as well as for the manufacture of laminates and composite articles. The high flexural strength and impact strength of the cured polyesters is of especial advantage for the manufacture of castings and shaped articles, but also in their use as paints and coatings.

The following examples serve to illustrate the invention, but they are not intended to limit it thereto.

EXAMPLE 1

1440 g. of a distillate prepared as described above from the crude dark ester pitch obtained as a residue in the manufacture of dimethyl terephthalate and distilled in a thin layer evaporator under a vacuum of 3.5 mm. and at a wall temperature of 270° C. are introduced into a reaction vessel. The distillate has a saponification number of 475. 1368 g. of propylene-1,2 glycol are added to this material at 180° C. to 205° C. in the presence of 1.5 g. of ethyl hexyl titanate and the mixture is transesterified until more than 90% of the theoretical quantity of methanol has been split off. Two to five hours may be required for this. The mixture is then allowed to cool to about 160° C., 1176 g. of maleic anhydride are added and esterification is carried out in the presence of toluene as an entraining agent at 180° to 200° C. until an acid number of 50 is reached. In the course of this the water formed is removed by azeotropic distillation and the entraining agent is, after separating off the water, again returned to the reaction mixture (subsequently described, for brevity, as "in circulation"). All volatile material up to 180° C. sump temperature is then distilled off in vacuo. 3410 g. of a polyester are obtained which is stabilized with 0.85 g. of hydroquinone and diluted with 2200 g. of styrene at 100 to 110° C. After addition of 2 percent by weight of methyl ethyl ketone peroxide and 1 percent by weight of cobalt octoate solution (10% strength in dimethyl phthalate) a 1 cm. thick sheet is cast from this solution. This sheet is allowed to stand at room temperature and is thereafter given a post-hearing of 10 hours at 110° C. After cure the resin has a flexural strength of 900–1000 kg./cm.$^2$, an impact strength of 9–10 cm. kg./cm.$^2$ and a Martens temperature of 86–87° C.

COMPARISON EXAMPLE 148 parts by weight of phthalic anhydride are introduced into a reaction vessel. 240 parts by weight of propylene-glycol 1,2 are added at about 110° C. to 160° C. and the mixture is reacted for 4 hours. The mixture is then allowed to cool to about 100° C., 196 g. of maleic anhydride are added and esterification is caried out in the presence of toluene as an entraining agent at 180° C. to 200° C. until an acid number of 50 is reached. In the course of this reaction the water formed is removed by azeotropic distillation and the entraining agent is, after separating off the water, again returned to the reaction mixture.

All volatile material up to 180° C. sump temperature is then distilled off in vacuo, 520 g. of a polyester are obtained which is stabilized with 0.12 g. hydroquinone and diluted wiht 295 g. styrene at 100–110° C. After addition of 2 percent by weight of cobalt octoate solution (10% strength in dimethyl phthalate) a 1 cm. thick sheet is cast from this solution. This sheet is allowed to stand at room temperature and is thereafter given a post-heating of 10 hours at 110° C. After cure the resin has a Martens value of 80° C., a flexural strength of 700–900 kg./cm.$^2$ (measured according to DIN 53452) and an impact strength of 5–7 cm. kg./cm.$^2$ (measured according to DIN 53453).

EXAMPLE 2

1440 g. of distillate as described in Example 1 and 1872 g. of neopentyl glycol are, after addition of 1.5 g. of ethylhexyl titanate, transesterified over the course of 2 to 5 hours at 190° C. to 210° C. until the elimination of methanol ceases. After cooling to 160° C. 1176 g. of maleic anhydride are added and the mixture is esterified at 180° C. to 200° C. with toluene in circulation until an acid number of 38.5 is reached. After distilling off the toluene in vacuo and stabilizing with hydroquinone the resulting polyester (3900 g.) is diluted with 2400 g. of styrene to give a resin content of 62 percent by weight. The resin solution then has an acid number of 18.8 and a viscosity of 982 cp. at 20° C. Sheets are manufactured from the solution in accordance with Example 1 and cured. The cured resin has a flexural strength of 1080 kg./cm.$^2$, an impact strength of 9 cm. kg./cm.$^2$ and a water uptake of 0.11% over the course of 2 hours at 100° C.

EXAMPLE 3

The procedure of Example 2 is followed but using 1920 g. of diethylene glycol instead of 1872 g. of neopentyl glycol. 3900 g. of resin, which as a 60% strength solution in styrene has a viscosity of 839 cp. (20° C.) with an acid number of 13.3, are obtained. The cured resin has an impact strength of 11.4 cm. kg./cm.$^2$.

EXAMPLE 4

1080 g. of the ester pitch distillate according to Example 1 are transesterified with 2025 g. of triethylene glycol in the presence of 1.5 g. of ethylhexyl titanate at 200 to 208° C., in accordance with Example 1. After adding 880 g. of maleic anhydride at 125° C. the mixture is further esterified to an acid number of 18.9 at 180 to 210° C. 3425 g. of resin are obtained. After stabilization with 0.68 g. of hydroquinone the mixture is diluted with 2200 g. of styrene. The solution is processed into cured sheets in accordance with Example 1. After cure a flexible resin is obtained which in spite of its high triethylene glycol content only shows an insignificant water uptake.

EXAMPLE 5

1200 g. of ester pitch distillate according to Example 1 are transesterified with 570 g. of propylene glycol, 780 g. of neopentyl glycol and 1.3 g. of ethylhexyl titanate at 200° C. to 208° C. 980 g. of maleic anhydride are added at about 150° C. and the mixture esterified at 170 to 200° C. until an acid number of 21.8 is reached. The highly viscous resin (4040 g.) can be run into pans and can be ground after having cooled, for example, on a hammer mill. The ground resin immediately easily dissolves in cold styrene. A solution containing 58.4 percent by weight of resin has an acid number of 11.2 and a viscosity of 2220 cp. (at 20° C.). The solution is further processed in accordance with Example 1. After cure, a flexural strength of 770 kg./cm.$^2$, an impact strength of 8.6 cm. kg./cm.$^2$ and a Martens value of 107 to 110° C. are found.

I claim:
1. A process for making polyester resins from the by-product residues obtained from the oxidation and esterification of p-xylene to yield the dimethyl ester of terephthalic acid and the recovery of the terephthalic acid methyl ester from the reaction mixture, said process comprising distilling said residues under reduced pressure to obtain a relatively high molecular weight mixture of aromatic polycarboxylic acid esters having a saponification number of 430 to 550, transesterifying said mixture with an excess of polyhydric alcohol to obtain esters of said polycarboxylic acid mixture having free hydroxyl groups, esterifying the resulting hydroxyl-terminated esters with maleic acid or its anhydride to form unsaturated polyesters and reacting said unsaturated polyesters with one or more monomers selected from styrene, diallylphthalate and acrylic or methacrylic acid esters to form said polyester resin.

2. A process according to claim 1 wherein said monomer is styrene.

3. A process according to claim 1 wherein said polyhydric alcohol is propylene-1,2-glycol.

4. A process according to claim 1 wherein said polyhydric alcohol is neopentyl glycol.

5. A process according to claim 1 wherein said polyhydric alcohol is diethylene glycol.

6. A process according to claim 1 wherein said polyhydric alcohol is triethylene glycol.

7. A process according to claim 1 wherein said polyhydric alcohol is a mixture of neopentyl glycol and propylene glycol.

8. A process according to claim 1 wherein the distilled residues are hydrogenated in the presence of a nickel catalyst before being reacted with said polyhydric alcohol.

9. A polyester resin prepared by the process of claim 1.

References Cited

UNITED STATES PATENTS

| | | | |
|---|---|---|---|
| 2,904,533 | 9/1959 | Carlston et al. | 260—75 |
| 3,008,934 | 11/1961 | Wielicki et al. | 260—75 |
| 3,197,439 | 7/1965 | Frey | 260—75 |
| 3,223,666 | 12/1965 | Bolton | 260—29.2 |
| 3,293,223 | 12/1966 | Duling | 260—75 |
| 2,976,266 | 3/1961 | Lytton et al. | 260—75 |
| 3,374,201 | 3/1968 | Wiener | 260—47 |

MELVIN GOLDSTEIN, Primary Examiner

U.S. Cl. X.R.

260—75 UA, 475 R, 863, 872